United States Patent [19]

Langeland et al.

[11] Patent Number: 4,992,990
[45] Date of Patent: Feb. 12, 1991

[54] METHOD FOR DETERMINING THE POSITION OF SEISMIC STREAMERS IN A REFLECTION SEISMIC MEASURING SYSTEM

[75] Inventors: Jan-Åge Langeland, Garnes; Stein ÅSheim; Bjorn Nordmoen, both of Oslo; Erik Vigen, Drammen, all of Norway

[73] Assignee: Geco A.S., Sandvika, Norway

[21] Appl. No.: 460,146

[22] PCT Filed: Jun. 6, 1989

[86] PCT No.: PCT/NO89/00055
§ 371 Date: Jan. 30, 1990
§ 102(e) Date: Jan. 30, 1990

[87] PCT Pub. No.: WO89/12236
PCT Pub. Date: Dec. 14, 1989

[30] Foreign Application Priority Data

Jun. 6, 1988 [NO] Norway ................................ 882495

[51] Int. Cl.⁵ ............................................... G01V 1/38
[52] U.S. Cl. ................................................... 367/19
[58] Field of Search ....................... 367/6, 19, 129, 130

[56] References Cited

U.S. PATENT DOCUMENTS

| | | | |
|---|---|---|---|
| 4,532,637 | 7/1985 | Baeckel et al. | 367/19 |
| 4,660,185 | 4/1987 | French | 367/19 |
| 4,669,067 | 5/1987 | Roberts | 367/19 |
| 4,845,686 | 7/1989 | Brac | 367/19 |

FOREIGN PATENT DOCUMENTS

| | | |
|---|---|---|
| 2393320 | 12/1978 | France . |
| 2620536 | 3/1989 | France . |
| 0831513 | 5/1984 | Norway . |
| WO07732 | 12/1987 | World Int. Prop. O. . |

OTHER PUBLICATIONS

Sonerdyne Limited Publication, "A Hydro-Acoustic System for Precision Tracking of Twin Seismic Hydrophone Streamers," 7/87.
"Improving the Accuracy of Merile 3D Seismic Surveys," Ocean Industry, Jan. 1987.

*Primary Examiner*—Ian J. Lobo
*Attorney, Agent, or Firm*—Fleit, Jacobson, Cohn, Price, Holman & Stern

[57] ABSTRACT

A method for determining the position of at least two seismic streamers ($S_1$, $S_2$) in a reflection seismic measuring system, wherein hydroacoustic distance measurements are used which are taken by means of acoustic transceivers provided in vessels (1), buoys (8), floats (5), seismic sources (2) and in the seismic streamers ($S_1$, $S_2$). Absolute reference positions are determined by position determining equipment provided in at least two locations, for instance, on a vessel (1) or a float (5). The acoustic transceivers and the position determining equipment form a three-dimensional structure. The position determination takes place by trilateration between the acoustic transceivers and the determination of at least two reference positions so that there is no dependency on compass bearings or optical visibility, and high redundancy is obtained. The method is particularly suited for application in connection with three-dimensional marine seismic surveys. The method may be integrated with suitable surface navigation systems in order to find the reference positions and provide absolute positions at any point within a marginal error of 5 to 10 m.

18 Claims, 5 Drawing Sheets

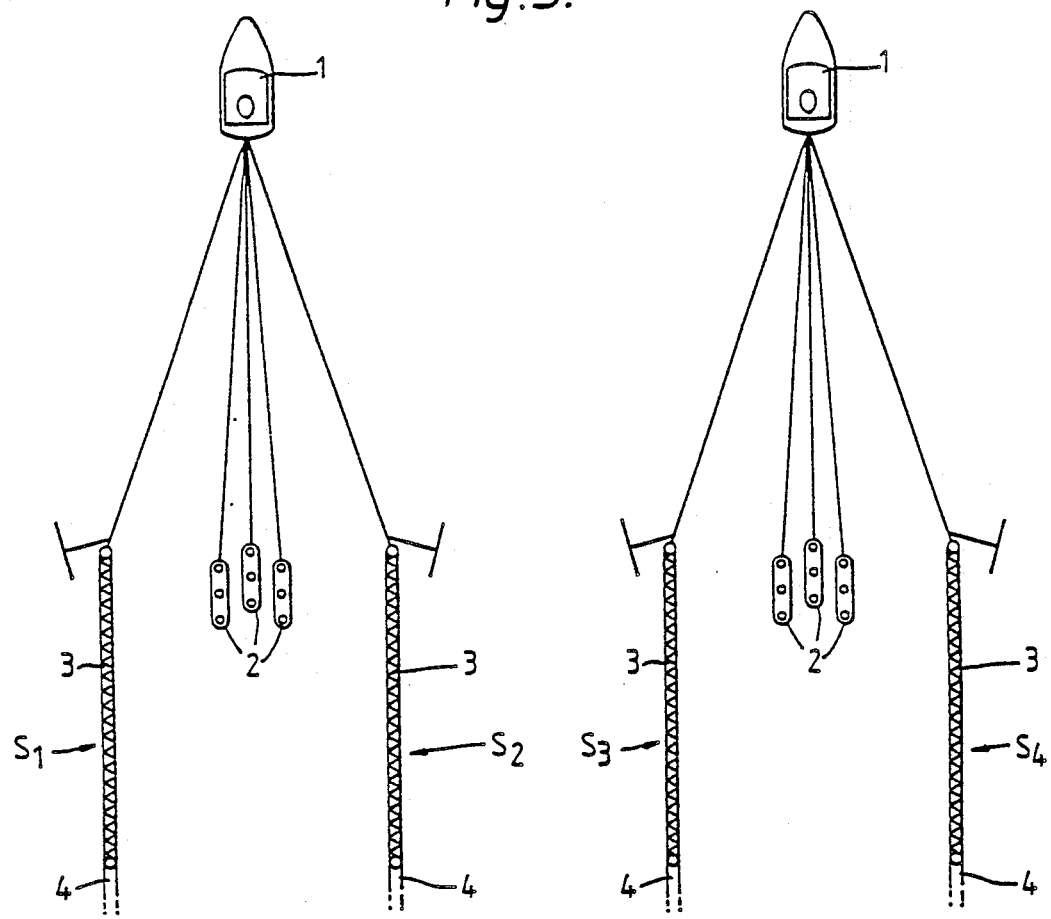
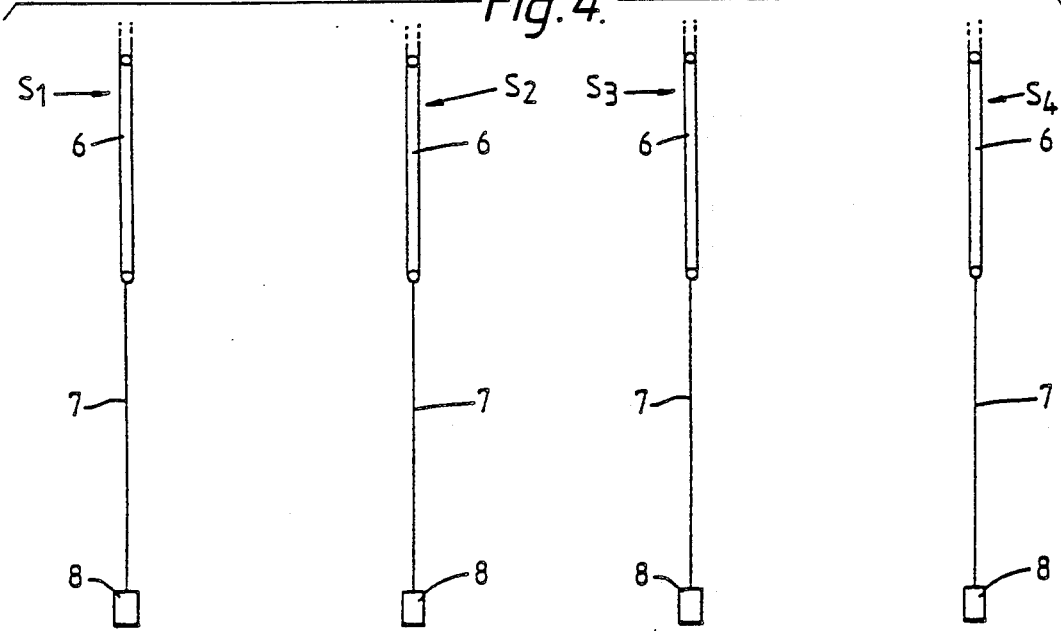

METHOD FOR DETERMINING THE POSITION OF SEISMIC STREAMERS IN A REFLECTION SEISMIC MEASURING SYSTEM

BACKGROUND OF THE INVENTION

The invention relates to a method for determining the position of at least two seismic streamers in a reflection seismic measuring system, in connection with marine seismic surveys.

Lately there have come into use three-dimensional exploration methods for marine seismic surveys. Such exploration methods place heavy demands on navigation and positioning and one is dependent on knowing the relative positions of seismic sources and the hydrophones of the seismic streamer with great precision. In modern seismic exploration methods several sources and several seismic streamers are usually employed, and the mutual distances between these must also be determined with relatively high precision. The seismic sources and the seismic streamers are usually towed by one or more exploration vessels, and the exploration vessels' absolute position at any time is determined by means of surface navigation systems aboard the vessel or the vessels, these navigation systems preferably being land-based or satellite-based radio navigational systems which give a resolution below 0.5 m and a repeatable positioning accuracy of a few meters. It is then necessary to determine the position of the seismic streamers or in reality the position of the hydrophones of the seismic streamers with as high accuracy as possible, the basis for this position determination being the absolute position found by the navigational system of the vessel.

A seismic streamer comprises a plurality of active streamer sections with known length and equipped with hydrophones or hydrophone groups with known location in the active sections. The seismic streamer is arranged between stretch sections, a fore stretch section being connected with a towing means on the towing vessel, whereas a tailbuoy with means for determining the position is provided at the end of the aft strech section. The means may for instance be an active navigation system of the same type that is employed aboard the towing vessel or a microwave system, possibly combined with a goniometer. The position of the tailbuoy may also be determined by passive distance measurements between the towing vessel and the buoy, for instance by means of radar or laser reflectors. Now knowing the positions of the vessel and the tailbuoy, the position of the hydrophones in the seismic streamer is determined on the basis of the known length of the streamer, the known location of the hydrophones in the streamer and the orientation of the separate sections of the vessel and the tailbuoy. This orientation may in principle be provided by taking a bearing between the vessel and the tailbuoy using compass devices aboard the vessel. However, due to swing of the seismic streamer caused by sea currents, an angular deviation between the streamer and the ship's bearing is generated. In practice the seismic streamer will hence have the shape of a plane or a spatial curve, but the said angular deviation may be determined by providing a plurality of magnetic compasses in the cable, typically for instance twelve compasses in a streamer of three kilometers length, and normally with a compass close to each end of the streamer. Compasses are also provided in the stretch section. The curve of the streamer may then be determined for instance by means of mathematical estimation in connection with compass bearings, known distances and section lengths. As a rule, however, the error in the actual distance to a streamer section will lie within the errors of the position determining system, referred to the navigation accuracy.

At present a number of methods are employed or proposed to be employed, for determining the streamer's position, based on distance measurements in connection with compass bearings. One method is to determine supposed distances to the single streamer sections based on how much towing cable is being handed out from the towing vessel, at the same time as bearings are taken with the magnetic compasses in the streamer. The method, however, is encumbered with substantial errors, since the stretch sections of the streamer may be stretched such that the distances may vary with about 10 to 15 m, and there are small possibilities of determining this discrepancy accurately. Changes in the course of the vessel will result in a poorer determination of bearing when the streamer with compasses starts to stretch as a result of the movement of the vessel.

Norwegian patent application 83 1513 discloses a method for determining the position of a seismic streamer which is towed through the sea by a vessel. Herein azimuth and distance from the vessel to points on the seismic streamer are measured, and the coordinates of the points are calculated by means of these values. Furthermore, a hydroacoustic measurement method based on a ultra-short base line system is used, which is integrated with the gyro-compass of the vessel for azimuth and distance measurements against transponders, responders or similar devices provided on or in the seismic streamer. This method gives no measurement of redundancy and there are hence limited possibilities of discovering errors in the system. Further, one is dependent on determining a reference bearing and this bearing must be taken with a gyro-compass having a limited accuracy.

Another method which uses acoustic distance measurement techniques for determining the streamer position is described in the paper "Improving the accuracy of marine 3-D seismic surveys", Ocean Industry, Jan. 1987. Here acoustic transceivers provided on the fore end of the seismic streamer and at the seismic sources are used, while acoustic receivers are provided aboard the vessel. The determination of directions are made by compass bearings, but relatively acute intersecting angles give fairly large errors in the angle readings and in addition too few measurements for achieving sufficient redundancy and determination of measurement errors. A further hydroacoustic positioning system for two seismic streamers is disclosed by a report from Sonardyne Ltd. with the title "A hydroacoustic system for precision tracking of twin hydrophonic streamers" (ref.: C/87/363). This system provides more measurements so as to achieve a somewhat better redundancy than the aforementioned system. The determination of the direction takes place by compass bearings, but the bearings of the seismic streamer fore ends result in relatively acute angles having fairly large measurement errors. Additionally, the position of the seismic source is not determined.

An acoustic distance measurement technique has also been applied to the problem of determining the horizontal profile of a towed seismic streamer. To that end US-PS No. 4 532 617 (Baecker and Bijou) discloses a system and a method based on using a slave vessel in addition to the towing vessel, acoustic transponders being provided in the vessels and along the seismic streamer. The positions of the vessels are determined and the distances between the vertices of a triangle formed by the vessels and a respective transponder on the streamers are found, allowing a representation of the profile of the streamer to be obtained. The method as taught by the publication thus employs per se known techniques, but the proposed system is not well suited for determining the position of several towed objects and would be hightly impractical to adopt for positioning tasks in a 3-D marine seismic surveying system employing more than one streamer.

Systems wherein distance measurements are made by means of optical methods and microwave methods are also encumbered with a number of deficiencies. Using a laser one is dependent on optical visibility and both laser measurements and radiogoniometry must be used in connection with compass bearings, which in view of the measuring errors of the gyrocompass leads to inaccurate direction determinations. Furthermore, it is only possible to determine the position of floats, rafts, paravanes etc., i.e. devices which float on the surface of the sea. Thus, all the above-mentioned methods have certain disadvantages and deficiencies. Even if distances and absolute positions may be found with sufficient accuracy, these disadvantages, however, are of such a nature that the methods do not furnish a general, total measuring accuracy or sufficient redundancy to achieve an accurate determination of the measuring errors.

BRIEF SUMMARY OF THE INVENTION

The object of the present invention is to provide a method for determining the position of at least two seismic streamers in a reflection seismic measuring system, so as to avoid the above-mentioned drawbacks and the necessity of using relatively inaccurate compass bearings, while at the same time advantageously achieving a better measuring redundancy and a far better detection of the occurring measuring errors.

According to the present invention a method based on acoustic trilateration is used, i.e. the use of hydroacoustic distance measurements between a plurality of acoustic transceivers arranged in a suitable manner. At the same time at least two points of the measuring system are determined by means of surface navigation methods. These points may preferably be the exploration or towing vessel, a tailbuoy on the seismic streamer or even more advantageous, a float which is towed by the vessel in such a manner that it is located on the side of or near the beginning of the seismic streamer. Since all the units of the measuring system, whether being buoys, floats, seismic sources, vessels or seismic streamers, are more or less submerged, it is a fairly simple matter to measure the distance between these units below the surface by means of hydroacoustic distance measurements. Therefore acoustic transceivers are provided at every point, whose mutual distances it is desired to determine, i.e. aboard the vessel or vessels on the seismic sources, on the end points of the seismic stretch sections and possibly also in the active sections of the seismic streamers and on the float or floats towed by the vessels as well as in the tailbuoys. For instance a vessel and a float or the vessel and a tailbuoy may now be suitably positioned by means of surface navigation systems. By means of distance measurements between the hydroacoustic measuring devices, i.e. the acoustic transceivers, a triangle network may be established, comprising the vessel or the vessels, floats, buoys, points on the seismic streamers and the seismic sources. Then a triangle network may be established between every measuring point and the measuring points of the triangle network may be referred to absolute reference positions, for instance the position of a vessel or a buoy. Hence the position of all the acoustic transceivers may be absolutely determined. The acoustic distance measurements may be integrated with the position determinations for instance in a computer system located aboard the vessel. Another advantage is that the hydroacoustic measuring system, i.e. the acoustic transceivers, may be based on standard units, for instance as provided by Navigation Technology, whereas the position determining tailbuoys or floats may be of the Syledis or Hyperfix type. By using a method for determining the position according to the above, one is wholly independent of compass bearings in order to find directions and orientations, and at the same time the method gives a better accuracy than other known systems, i.e. measurement accuracies in the distances of $\pm 1$ m non-normalized repeatability within 2 to 3 m deviation and cross-line errors of 3 to 5 m in 300 at the most, which corresponds to that which is achieved with the best surface navigation systems. By providing a sufficient number of acoustic transceivers, a very high redundancy is achieved so that the measuring system will not go down or the positioning accuracy will not be influenced, even if local errors are caused by some of the acoustic transceivers falling out. The fact that the measuring system is over-determined, i.e. measurements may be taken from a number of points to one and the same point and vice versa, so that a plurality of different triangle networks are generated, offers a possibility of performing a statistic analysis of the measurement errors, and any suitable statistic optimizing method may be used, for instance the least squares method, in order to choose the best values for distances and positions.

The method according to the invention may be applied when severel vessels are employed, and several seismic streamers and positions for seismic measuring equipment behind a plurality of vessels may be combined in the same triangle network. Furthermore, a continuous monitoring of registered positions may be undertaken, while at the same time determining the position of the measuring devices, i.e. the acoustic transceivers, directly.

The measuring system of the method according to the invention may advantageously be integrated in a telecommunication system which connects ship-based navigation and computer equipment with further position determining devices, and functions such as synchronizing, controlling and monitoring may then advantageously take place through this telecommunication system which also is used for transmitting measurement data. By means of suitable control software the measuring system employed with the method may suitably be adapted to discover and compensate measuring errors automatically.

Normally the acoustic distance measurements are taken within a measuring cycle with a duration of 5 to 10 s and with regard to the seismic data collection. As the shot interval in seismic data surveys typically may be about 10 s, the acoustic distance measurements may advantageously lie within this interval, so that no problems with interference are encountered. But the acoustic transceivers operate typically in the frequency band 25 to 40 kHz, i.e. 8 to 9 octaves above the frequency of the seismic sources. Moreover, screw cavitation and air bubbles from the air gun may also cause errors in the hydroacoustic measurements, but with a sufficient redundancy While also the acoustic transceivers are given a favorable location in relation to such sources of error, these should in practice offer no problems.

The above-mentioned objects and advantages are achieved by the method of the invention the features and advantages of which are described hereinafter.

BRIEF DESCRIPTION OF THE DRAWINGS

The method according to the invention may be more easily understood from the following detailed description of some non-limiting examples of embodiments with reference to the accompanying drawing, wherein:

FIG. 3 is a view similar to FIG. 1 which illustrates two towing vessels each towing two seismic streamers, only the fore part of each seismic streamer being shown;

FIG. 4 is a view similar to FIG. 2 showing the aft part of the seismic streamers according to FIG. 3;

DETAILED DESCRIPTION

In every Figure the same reference numbers denote similar parts, while in FIG. 5 to 9 a circle denotes an acoustic transceiver, a triangle a reference position and a circle in a triangle a reference position with an acoustic transceiver, a circle with a slanted arrow a compass, whole lines measured distances, double lines known distances and punctuated lines computed distances.

Figure 2:
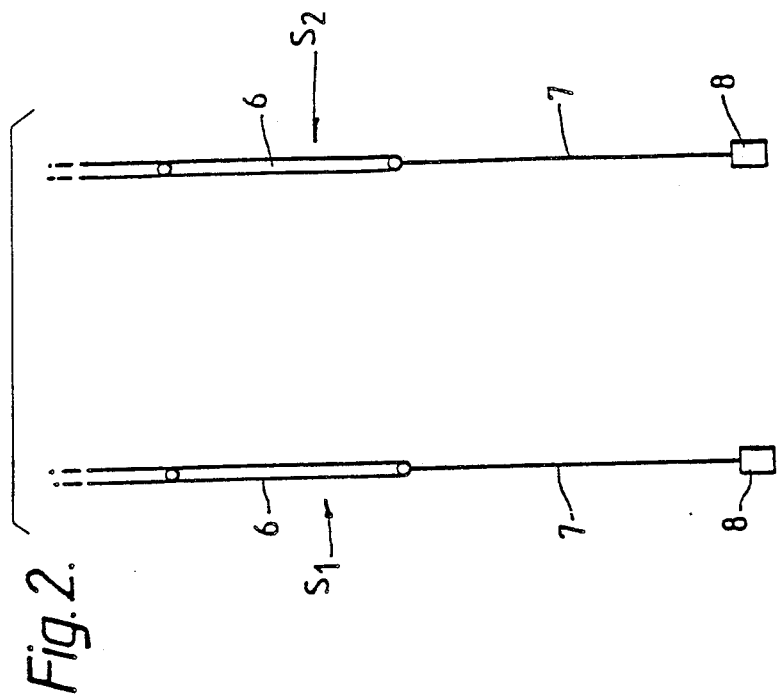
FIG. 2 is a schematic plan view of the aft end of the seismic streamer according to FIG. 1.
Figure 1:
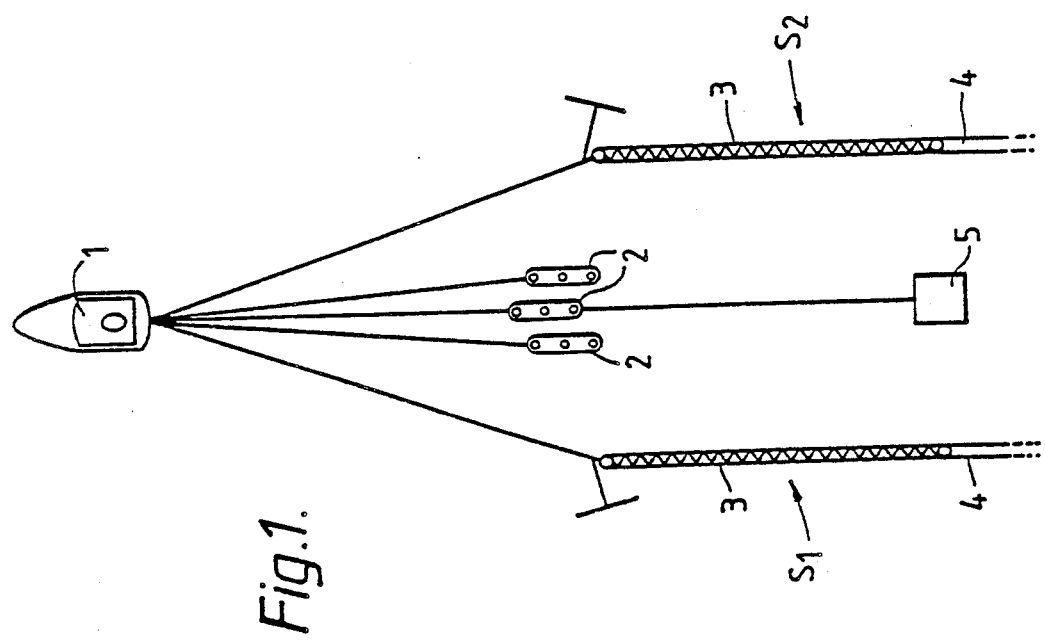
FIG. 1 is a schematic top plan view of a towing vessel towing two seismic streamers, only the fore end of the streamers being shown.
Figure 6:
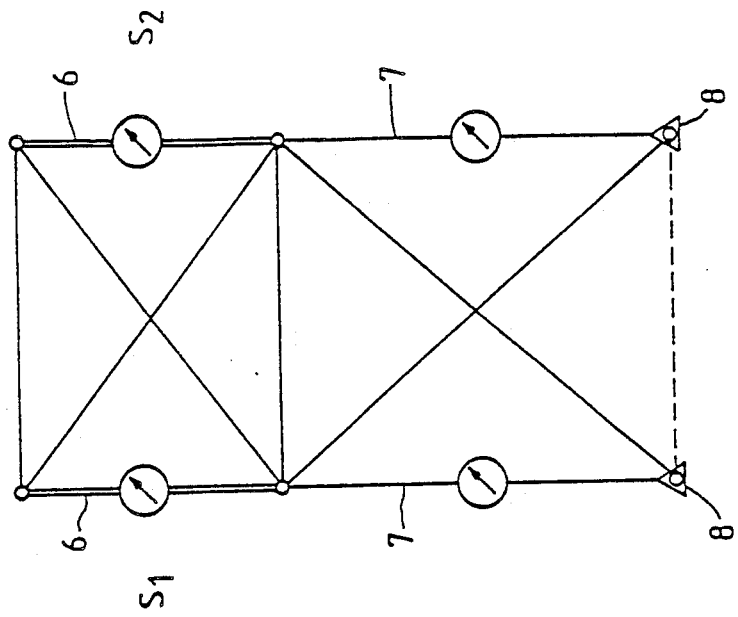
FIG. 6 is a diagram of another section of the triangle network according to FIG. 5.
Figure 5:
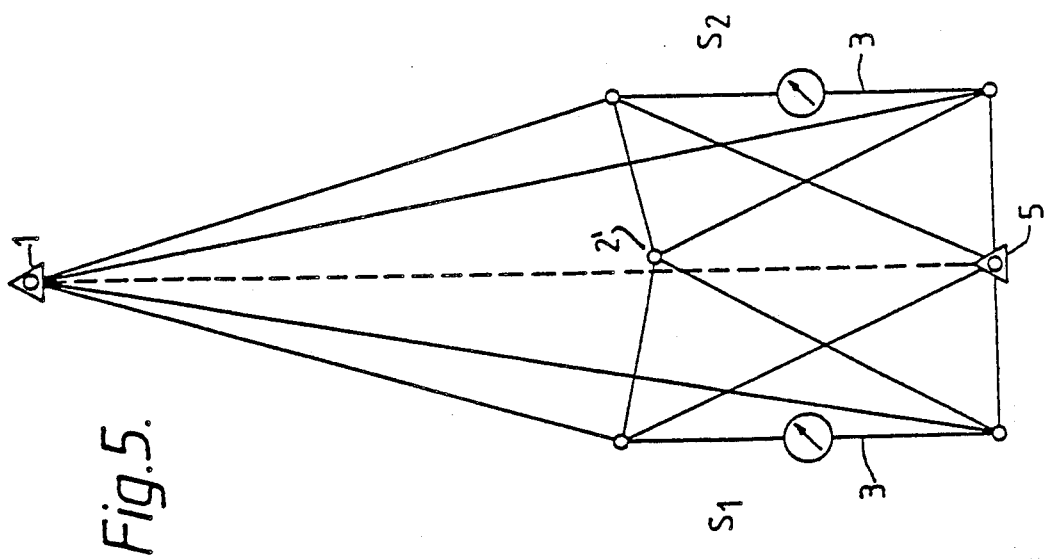
FIG. 5 is a section diagram of a of a triangle network for a vessel towing two seismic streamers.
Figure 7:
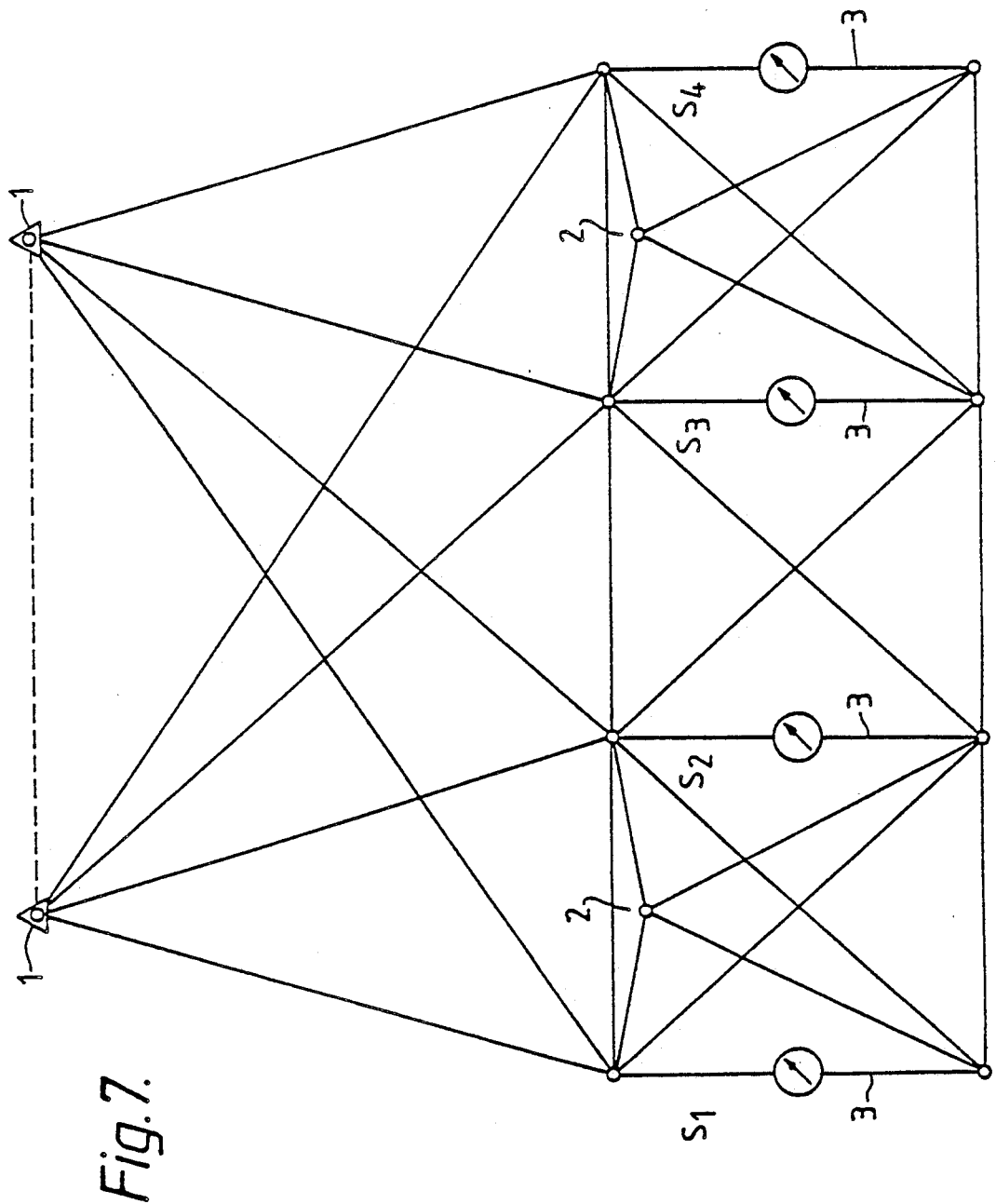
FIG. 7 is a section diagram similar to FIGS. 5 and 6 showing a of a triangle network for two vessels, each towing two seismic streamers.
Figure 8:
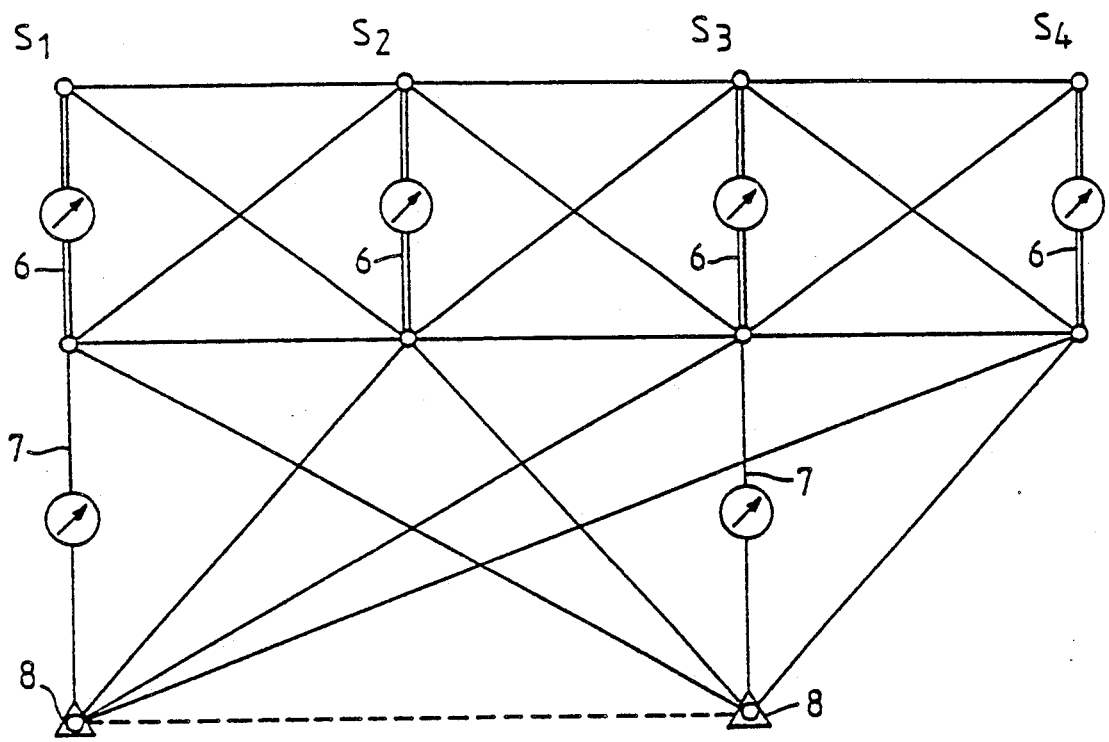
FIG. 8 is a diagram of another section of the triangle network according to FIG. 7; and, FIG. 9 is a diagram of a further second section of a triangle network for two seismic streamers.
Figure 9:
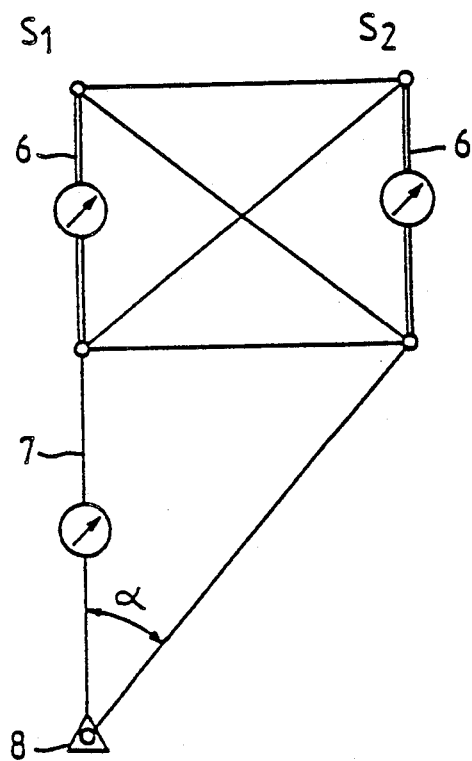

In FIG. 1 there is shown an exploration or towing vessel 1 which tows two seismic streamers $S_1$ and $S_2$ and seismic sources 2. To the extension of the towing cable of one of the seismic sources 2 a float 5 is attached. Of the seismic streamers which are towed by a towing cable a first stretch section 3 is shown, followed by the fore active section 4. In FIG. 5 there is shown a section of a triangle network for the system in FIG. 1. The triangle network of FIG. 1 comprises the vessel 1, a seismic source 2, the fore stretch sections 3 of the seismic streamers $S_1$ and $S_2$ as well as a float 5. Aboard the vessel and the float 5 equipment is provided for position determination, while acoustic transceivers are provided aboard the vessel, at the end points of each of the stretch sections, on the seismic source and on the float, respectively, as shown. By using hydroacoustic measurements the mutual distances between the acoustic transceivers are now determined, the distances, as mentioned, being shown by whole lines. At the same time the positions of the vessel 1 and the float 5 are found and the distance between them, as shown by the punctuated line, is computed. The known positions of the vessel 1 and the float 5 are sufficient to determine the geographic orientation of all the triangles of the shown triangle network. It will also be understood that the triangle network may be generated by other triangles than those shown in FIG. 5, as in practice it is possible to measure all the mutual distances between the acoustic transceivers. In FIG. 2 the aft part of the streamers in the system in FIG. 1 are shown, $S_1$ and $S_2$ denoting the two seismic streamers, 6 a last active section of the seismic streamers, 7 the aft stretch sections and 8 tailbuoys connected to the aft stretch sections. FIG. 6 shows a triangle network for the system of FIG. 2. The provision of acoustic transceivers at the end points of the last active section 6 is seen, in other words also at the beginning of each stretch section 7. Further, there are provided acoustic transceivers in the tailbuoys 8 which are also provided with equipment for position determination. By means of these the distances between the tailbuoys 8, as shown by the punctuated line, are computed, whereas the other distances of the triangle network are determined by means of hydroacoustic measurements of the mutual distances between the acoustic transceivers, such as those distances shown by whole lines. The triangle network is direction determined by means of the known positions of the tailbuoys 8. Also here it is evident that the triangle network may be generated in another way than the one shown, In FIG. 3 there are shown two towing vessels 1 which respectively tows two seismic streamers $S_1$, $S_2$, $S_3$, $S_4$ and further a plurality of seismic sources 2. The seismic streamers are designed in the same way as the system in FIG. 1. In FIG. 7 there is shown a triangle network for the system in FIG. 3. All whole lines denote distances in the triangle network found by means of hydroacoustic measurements performed with the acoustic transceivers which are arranged as shown. i.e. at the end points of each stretch section 3 in each of the seismic streamers $S_1$, $S_2$, $S_3$, $S_4$, and at one of the seismic sources 2, as well as aboard the vessels 1. Two reference positions are determined by means of equipment for determining position aboard the two vessels 1 and provide in addition to the orientation of the triangle network also the computed distance between the vessels 1, as shown by the punctuated line. Also in this case the triangle network may be generated in other ways than the one shown by measuring other mutual distances between the acoustic transceivers. Thus, it is easy to see that a high degree of measurement redundancy is achieved. FIG. 4 shows for the same system as in FIG. 3, the end sections of each of the seismic streamers $S_1$, $S_2$, $S_3$ and $S_4$, the last active section 6 in each seismic streamer and the following aft stretch section 7 being shown, as well as tailbuoys 8 connected to each strech section 7. FIG. 8 shows a triangle network for that part of the system with two vessels and four seismic streamers which is shown in FIG. 4. Two reference positions are determined with equipment in the two tailbuoys 8 which are respectively connected to the seismic streamers $S_1$ and $S_3$, and the mutual distance between these tailbuoys is computed. The other distances in the triangle network are measured with the acoustic transceivers ehich are provided in the tailbuoys, as well as at the end points of the last active section 6 in each of the seismic streamers $S_1$, $S_2$, $S_3$, $S_4$. Also here other triangle networks than the one shown in the Figure may easily be generated.

Thus by the method according to the invention a triangle network is obtained, in which each of the measuring points consists of hydroacoustic or acoustic transceivers arranged as shown above or of points, the absolute position of which is determined by means of surface navigation methods. The triangle network is thus completely determined by trilateration between the measuring points, i.e. the acoustic transceivers and two reference positions provided by means of equipment for position determination aboard vessels, floats or tailbuoys. Thus it is not necessary to use compass measurements when determining the triangle network, since this, as mentioned, is completely directionally determined by means of two reference positions.

By arranging acoustic transceivers in a number of points and having the possibility of determining more reference positions than two by for instance providing each tailbuoy, each vessel, each float etc. with position determining equipment, it will be seen that a large number of different triangle networks may be generated in order to determine specific positions in the measuring system. The positions are hence over-determined, and a substantial redundancy of the system is achieved. This provides the advantage of determining the position of the seismic streamers even if one or more measuring points should fall out or certain measurement values for one reason or other are subjected to inadmissible noise or other sources of error. If the redundancy comes into full effect because of a substantial degree of over-determination and several different triangle networks are generated, a statistical optimization of measuring errors may be performed and by means of statistical optimization procedures the best values of positions and distances in the triangle network may be determined, which may lead to an improved accuracy in the determination of the position of the seismic streamers.

If after all the equipment for determining the position should fail at one or more measuring points or the position data for one or more measuring points for some reason or other should fall out, it is still possible to perform a position determination of the seismic streamers by using for instance a single reference position combined with a compass bearing. Then it is possible to use compass bearings at an angle where the measurement error may be relatively small, so that the error in the distance computed in this manner will also become relatively small. This means that the intersecting angle should not be too acute. A practical example of a position determination involving a compass angle and a reference position is shown if FIG. 9. Here 6 denotes the last active sections of the two seismic streamers $S_1$, $S_2$, 7 is the aft stretch section of the seismic streamer $S_1$, 8 is the tailbuoy connected to this stretch section which also is provided with a compass. The reference position is determined with the equipment for position determination provided in the tailbuoy 8, and the triangle network is generated by distance measurements with acoustic transceivers provided in the tailbuoy 8 and on the end of the last active section 6, respectively. However, since one has only one reference position, the direction of the triangle network must be determined by the compass angle $\alpha$ which must be obtained by for instance a magnetic compass provided in the stretch section 7. However, the angle $\alpha$ has a value which gives a good relative measurement accuracy, for instance with a compass error of 0.5°, it will be only 1.25% for an angle $\alpha$ equal to 40°. The bearing angles may be also be provided by compasses arranged in the last active sections 6 so that the measurement errors may be treated statistically and one still has redundancy when determining the position of the seismic streamers or the distance therebetween.

By the method according to the invention position determination of the locations of the start points and end points of the seismic streamers is thus obtained, in practice the position of the ends of respectively the first and last active section of the streamer, but it is of course also possible to use acoustic transceivers in other parts of the seismic streamer, possibly along the whole seismic streamer. Hence, in theory, one may renounce the compasses provided in the streamer. However, the use of further acoustic transceivers other than those provided at the end of each active section of the seismic streamer would be a superfluous measure. The accuracy by using hydroacoustic measurements is so good that the error of the determination of the seismic streamer's end points lies at about ±1 m and in reality well within the statistical deviation of the position determination. However, since one knows the end point positions for the seismic streamer and furthermore the speed and bearing of the towing vessel and may estimate the current conditions of the measurement location, it is possible to perform a mathematical estimation of the error transmission through the active sections of the seismic streamer, i.e. from the position of the first to the last end point, and thus obtain an estimate of the curve of the active section of the seismic streamer so that the estimate will lie within the margins of error for the positions determined by means of surface navigation and acoustic trilateration. If the requirement of having the compass bearing as an additional possibility is disregarded, one could by the method according to the invention completely renounce the magnetic compasses, at least in the active sections of the seismic streamer.

We claim:

1. A method for determining the position of at least two seismic streamers, each having a fore end and an aft end, in a reflection seismic measurement system in 3-dimensional marine seismic surveys, wherein each seismic streamer is equipped with a plurality of compasses and comprises a plurality of active sections having known lengths inserted between a fore stretch section and an aft stretch section at each end, respectively, of the seismic streamers, said active sections being equipped with a plurality of hydrophones or hydrophone groups having known locations, wherein the fore stretch section is connected with a towing arrangement attached to a towing vessel and the end of the aft stretch section is provided with a tailbuoy having equipment for determining the position of the tailbuoy and an acoustic transceiver, and the measurement system further includes at least one seismic source provided with an acoustic transceiver and at least one towing vessel each equipped with an onboard computer system for positioning and navigational purposes and at least one acoustic transceiver, the method comprising:

towing a float by at least one vessel;
locating said float off and between the fore ends of said seismic streamers;
providing said float with position determining means and an acoustic transceiver;
disposing a plurality of acoustic transceivers at specific locations in each stretch section;
providing further acoustic transceivers at certain locations in at least one of said active sections adjacent to a stretch section, so that said seismic streamers, vessels and seismic sources constitute a 3-dimensional structure;

connecting said seismic streamers, seismic sources and floats with said at least one vessel in an arrangement forming at least one triangle network;

providing at least one reference position at the at least one vessel position and at least one reference position at the position of at least one of the float and a tailbuoy;

determining the position of the streamers by trilateration between the acoustic transceivers and the at least two reference positions, said trilateration comprising an acoustic distance measuring method producing hydroacoustic signals between the transceivers and determining the mutual distances between the acoustic transceivers by measuring the transit time of the hydroacoustic signals therebetween;

evaluating the thus determined reference positions and distances in the at least one triangle network in a first step, and evaluating in a second step the position of said seismic streamers and the position of every hydrophone or group of hydrophones in the seismic streamers; and implementing said first and second steps as calculation procedures in said onboard computer system.

2. A method as claimed in claim 1, wherein:
said trilateration and the position determination are performed synchronously in a measurement cycle.

3. A method as claimed in claim 2, wherein:
all the mutual distances between the acoustic transceivers and all the reference positions are registered in the single measurement cycle, the measurement cycle frequency is tuned to the hydroacoustic signal frequency and each measurement cycle lies within the interval between the hydroacoustic signals.

4. A method as claimed in claim 3, further comprising:
connecting the position determining equipment, the acoustic transceivers, the seismic sources and the computer system in a telecommunication system and tuning, controlling and synchronizing the elements in the telecommunication system by suitable software in the computer system.

5. A method as claimed in claim 4, further comprising:
using one reference position as well as at least one compass bearing to determine sides and geographical orientation of a triangle in the triangle network, the one reference position used being the position of a tailbuoy, and taking a compass bearing with a compass provided in the stretch section which connects the tailbuoy with a seismic streamer.

6. A method as claimed in claim 5, further comprising:
using the position of a float as the one reference position.

7. A method as claimed in claim 6 wherein:
the mutual distance between each seismic streamer is determined in a further step of the processing in the computer system.

8. A method as claimed in claim 7 wherein:
the reference positions are provided by the equipment for determining the position of the tailbuoy by a suitable surface navigation method.

9. A method as claimed in claim 2 wherein:
distances which are determined in a measurement cycle, in connection with the first evaluating step are subjected to a statistical optimization in order to determine the best values for the positions and the distances and/or to minimize the effect of measurement errors.

10. A method as claimed in claim 1, further comprising:
connecting the position determining equipment, the acoustic transceivers, the seismic sources and the computer system in a telecommunication system and tuning, controlling and synchronizing the elements in the telecommunication system by suitable software in the computer system.

11. A method as claimed in claim 1, further comprising:
using one reference position as well as at least one compass bearing to determine sides and geographical orientation of a triangle in the triangle network, the one reference position used being the position of a tailbuoy, and taking a compass bearing with a compass provided in the stretch section which connects the tailbuoy with a seismic streamer.

12. A method as claimed in claim 11, further comprising:
using the position of a float as the one reference position.

13. A method as claimed in claim 1 wherein:
the mutual distance between each seismic streamer is determined in a further step of the processing in the computer system.

14. A method as claimed in claim 1 wherein:
the reference positions are provided by the equipment for determining the position of the tailbuoy by a suitable surface navigation method.

15. A method as claimed in claim 1, further comprising:
placing at least one float beside a respective seismic streamer off the junction between the fore stretch section of said respective seismic streamer and its active section.

16. A method as claimed in claim 1 wherein the survey includes more than one pass with one or more vessels through the same surveying area or part thereof, and further comprising:
repeating said trilateration in each pass, generating at least one triangle network for each pass, and determining the position of every hydrophone or group of hydrophones in said seismic streamers in each pass.

17. A method as claimed in claim 16, wherein different offsets are used in each pass.

18. A method as claimed in claim 16, wherein different streamer lengths are employed by each vessel in each pass.

* * * * *